(12) United States Patent
Yao et al.

(10) Patent No.: US 7,780,058 B2
(45) Date of Patent: Aug. 24, 2010

(54) BRAIDED SOLDER

(76) Inventors: Siuyoung Yao, 5102 E. Piedmont Rd., Unit 2245, Phoenix, AZ (US) 85044; Brian Taggart, P.O. Box 93891, Phoenix, AZ (US) 85070

( * ) Notice: Subject to any disclaimer, the term of this patent is extended or adjusted under 35 U.S.C. 154(b) by 0 days.

(21) Appl. No.: 12/038,809

(22) Filed: Feb. 27, 2008

(65) Prior Publication Data

US 2009/0212091 A1 Aug. 27, 2009

(51) Int. Cl.
*B23K 35/14* (2006.01)
*B23K 31/02* (2006.01)

(52) U.S. Cl. .............. 228/56.3; 228/223; 228/226; 228/245; 228/246

(58) Field of Classification Search ........... 228/101, 228/245, 246, 56.3, 180.1, 180.2; 428/596, 428/600, 609, 670, 646, 672, 642
See application file for complete search history.

(56) References Cited

U.S. PATENT DOCUMENTS

| | | | | |
|---|---|---|---|---|
| 1,555,296 A | * | 9/1925 | Felix | 140/3 R |
| 1,980,890 A | * | 11/1934 | George | 428/385 |
| 2,088,446 A | * | 7/1937 | Specht | 228/130 |
| 2,427,727 A | * | 9/1947 | Huntley et al. | 174/94 R |
| 3,771,211 A | * | 11/1973 | Postupack | 228/124.1 |
| 3,988,884 A | * | 11/1976 | Kikugawa | 57/7 |
| 4,169,964 A | * | 10/1979 | Horvath et al. | 174/15.5 |
| 4,279,121 A | * | 7/1981 | Ryan et al. | 57/258 |
| 4,323,631 A | * | 4/1982 | Spirig | 428/605 |
| 4,336,420 A | * | 6/1982 | Benz | 174/125.1 |
| 4,377,032 A | * | 3/1983 | Benz | 29/599 |
| 4,497,867 A | * | 2/1985 | Bely et al. | 428/385 |
| 4,529,836 A | * | 7/1985 | Powers et al. | 174/94 R |
| RE32,086 E | * | 2/1986 | Spirig | 228/19 |
| 4,668,545 A | * | 5/1987 | Lowe | 428/35.1 |
| 5,143,273 A | * | 9/1992 | Topel et al. | 228/56.3 |
| 6,186,390 B1 | * | 2/2001 | Tadauchi et al. | 228/56.3 |
| 6,568,583 B2 | * | 5/2003 | Yumi et al. | 228/180.5 |
| 6,730,848 B1 | * | 5/2004 | Antaya et al. | 174/78 |
| 6,746,991 B2 | * | 6/2004 | Rey et al. | 505/470 |
| 6,848,610 B2 | | 2/2005 | Liu | |
| 7,444,801 B2 | * | 11/2008 | Rosenwasser et al. | 59/80 |
| 2004/0188496 A1 | * | 9/2004 | Liu | 228/56.3 |
| 2006/0081680 A1 | * | 4/2006 | Yoshimura et al. | 228/19 |
| 2006/0186172 A1 | * | 8/2006 | Klein et al. | 228/19 |

FOREIGN PATENT DOCUMENTS

| | | | | |
|---|---|---|---|---|
| JP | -06079490 A | * | 3/1994 | |
| JP | 2001-250441 A | * | 9/2001 | |

* cited by examiner

*Primary Examiner*—Kiley Stoner

(57) ABSTRACT

Improved solder and soldering methods are disclosed. In accordance with one technique, a solder having a plurality of individual wire strands braided together is used. In accordance with another technique, the braided solder comprises both the same solder composition and wire gauge in the individual solder wire strands. In accordance with another technique, the braided solder comprises at least two different solder compositions used in the individual solder wire strands. In accordance with another technique, the braided solder comprises at least two different wire gauges used in the individual solder wire strands. In accordance with another technique, the braided solder comprises at least one wire strand where the primary surface is coated with a thin layer of a noble metal. In accordance with another technique, the braided solder comprises at least one wire strand where flux material is present. In accordance with one soldering technique, a method of soldering is accomplished by melting a plurality of braided solder strands to join a plurality of metallic surfaces together.

6 Claims, No Drawings

BRAIDED SOLDER

TECHNICAL FIELD AND INDUSTRIAL APPLICABILITY OF THE INVENTION

The field of the invention relates generally to soldering and, more specifically, to braided solder techniques and associated soldering techniques using braided solder.

BACKGROUND OF THE INVENTION

Solder is fusible metal alloy used in a process called soldering. Solder is melted to join a plurality of metallic surfaces together. Solders are special composition metals known as alloys that melt at relatively low temperatures. Commonly used solders contain tin and lead as base components. Many solder alloy variations exist. One common alloy combination used for solder is tin (Sn) and lead (Pb). One specific ratio of tin and lead solder used is 63/37 SnPb. This specific ratio of 63% Sn and 37% Pb is called a eutectic mixture which means that it has the lowest melting point of 183° C. as compared to all other ratios of SnPb solder.

Solder is useful in the fields of electronics and plumbing. For plumbing, the use of Pb in the solder has generally been replaced by copper (Cu) or antimony (Sb). Certain solder alloys may also contain silver (Ag). Solder works by melting when heated and bonding to metallic surfaces. Wetting is a term used to describe the bonding of the solder alloy to the metallic surfaces. The solder itself when bonded also provides an electrical path to the metallic surfaces joined.

Another type of solder is called hard solder. One application of hard solder is for brazing. Brazing involves a non-ferrous filler material or alloy that has a melting point above 425° C. One example of hard solder is a eutectic CuAg alloy. Brazing is used in the tool industry for joining hard metals like carbide and ceramics to tools like saw blades. Hard metals are generally hard to wet as compared to metals used in electronics.

Flux is a material used to prevent oxides from forming during the time the metallic surface is being heated. Flux chemically cleans the metallic surfaces being joined. Some examples of flux are ammonium chloride or rosin and zinc chloride.

The term gauge is a measurement method to describe the thickness or diameter of a single strand of wire. For example a 30 gauge wire is 0.005 inches in diameter.

The term plurality is two or more.

Certain soldering applications may require a certain gauge of solder wire to be utilized. Very fine solder wire with a high gauge number, like 30, may be difficult to manage during application due to a low stiffness of the very fine solder wire. In another situation, using very fine solder wire, the volume of solder needed for a particular application may make it difficult to keep the wire continuously fed from the wire spool to keep up with the soldering application. In another situation, it may be advantageous to utilize a combination of various solder compositions. In another situation, it may be advantageous to utilize at least one solder strand that has been coated with a noble metal. In another situation, it may be advantageous to utilize a flux material in combination with solder.

DETAILED DESCRIPTION OF PREFERRED EMBODIMENTS

Embodiments of improved soldering processes and braided solder employed in the processes are described herein. In the following description, numerous details are set forth to provide a through understanding of the embodiments of the invention. In certain instances, well-known structures, materials, or methods of operation may not be fully described in detail in order to highlight the key aspects of the invention.

Reference throughout this specification to "an embodiment" or "one embodiment" means that a particular feature, structure, or characteristic described in connection with the embodiment is included in at least one embodiment of the present invention. Particular features, structures, or characteristics described in connection with the invention may be combined in any suitable manner in one or more embodiments.

Improved solder and soldering methods are disclosed. In accordance with one technique, a solder having a plurality of individual wire strands braided together is used. In accordance with another technique, the braided solder comprises both the same solder composition and wire gauge in the individual solder wire strands. In accordance with another technique, the braided solder comprises at least two different compositions used in the individual solder wire strands. In accordance with another technique, the braided solder comprises at least two different wire gauges used in the individual solder wire strands. In accordance with another technique, the braided solder comprises at least one individual wire strand where the primary surface is coated with a thin layer of a noble metal. In accordance with another technique, the braided solder comprises at least one wire strand where flux material is present. In accordance with one soldering technique, a method of soldering is accomplished by melting a plurality of braided solder strands to join a plurality of metallic surfaces together.

The term braided solder is a structure formed by intertwining two or more strands of solder.

Braiding creates a composite material that is thicker and stronger than that of the non-intertwined solder strands.

The term plurality is used to describe two or more.

The term tin-based is used to describe various combinations of tin used with at least one other element including, but not limited to, silver, indium, and lead.

The term silver-based is used to describe various combinations of silver used with at least one other element including, but not limited to, tin, indium, and lead.

In accordance with one technique, a solder having a plurality of individual wire strands braided together is used. Each wire strand is intertwined around at least one other wire strand. One process for intertwining, or braiding, involves using machinery to draw a plurality of wire strands from separate spools and rotate at least one wire strand around at least one other wire strand to interweave a plurality of wire strands. The resulting composite material of braided wire strands is thicker and stronger than that of a single strand of wire.

In accordance with another technique, the braided solder comprises both the same solder composition and wire gauge in the individual solder wire strands. The resulting composite material of braided wire strands has the same melting point as each of the individual wire strands. The cross-sectional area as measured perpendicular to the length of the braided solder is larger than that of a single wire strand. This technique allows for more volume of solder during application using the same wire gauge for each of the strands as compared to using a single strand of wire at the same wire gauge.

In accordance with another technique, the braided solder comprises at least two different compositions used in the individual solder wire strands. In one embodiment, in accordance with this technique, one wire strand has a composition selected from at least two elements including, but not limited to, tin, indium, bismuth, antimony, silver, copper, and gold while a second wire strand has a different solder composition. Certain combinations of wire strands with different solder compositions may have certain benefits for certain soldering applications.

In accordance with another technique, the braided solder comprises at least two different wire gauges used in the individual solder wire strands. In one embodiment, in accordance with this technique, one wire strand has a gauge larger than the gauge of at least one other wire strand.

In accordance with another technique, the braided solder comprises at least one wire strand where the primary surface is coated with a thin layer of a noble metal. Noble metals include, but are not limited to, copper, silver, gold, platinum, and palladium. The noble metal helps prevents oxidation of the solder surface while the solder is heated to reach reflow temperature. As the solder temperature increases, portions of the noble metal are dissolved into the bulk solder. During reflow non-oxidized bulk solder is enabled to wet the metal surfaces of the members being joined.

In accordance with another technique, the braided solder comprises at least one wire strand where flux material is present.

In accordance with one soldering technique, a method of soldering is accomplished by melting a plurality of braided solder strands to join a plurality of metallic surfaces together. In one embodiment, in accordance with this technique, the braided solder comprises both the same solder composition and wire gauge in the individual solder wire strands. Each strand in the braided solder has the same melting point and is applied at the same volume rate.

In another embodiment, in accordance with this technique, the braided solder comprises at least two different compositions used in the individual solder wire strands. At least one strand in the braided solder has a higher melting point than at least one other strand due to the difference in composition. The tool used to apply this particular braided solder is designed to reach a temperature at or above the temperature of the strand with the highest melting point.

It will be readily understood to those skilled in the art that various other changes in the details, material, and arrangements of the parts and methods which have been described in order to explain the nature of this subject matter may be made without departing from the principles and scope of the subject matter as expressed in the subjoined claims.

What is claimed is:

1. A material for soldering, comprising:
   a plurality of braided solder strands; and
   wherein at least one of the solder strands comprises a surface coated with a noble metal; and
   wherein at least one of the solder strands is coated with flux; and
   wherein at least one of the braided solder strands comprises a different composition than at least one other braided solder strand.

2. The material for soldering of claim 1, wherein each of the braided solder strands is the same gauge.

3. The material for soldering of claim 1, wherein at least one of the braided solder strands is a different gauge than at least one other braided solder strand.

4. A method of soldering, comprising:
   melting a plurality of braided solder strands to join a plurality of metallic surfaces together; and
   wherein at least one of the solder strands comprises a surface coated with a noble metal; and
   wherein at least one of the solder strands is coated with flux; and
   wherein at least one of the braided solder strands comprises a different composition than at least one other braided solder strand.

5. The method of soldering of claim 4, wherein each of the braided solder strands is the same gauge.

6. The method of soldering of claim 4, wherein at least one of the braided solder strands is a different gauge than at least one other braided solder strand.

* * * * *